US011805735B2

(12) United States Patent
Hefner

(10) Patent No.: US 11,805,735 B2
(45) Date of Patent: Nov. 7, 2023

(54) STALKY CROP HARVESTING SYSTEM AND PROCESS

(71) Applicant: Formation Ag International LLC, Monte Vista, CO (US)

(72) Inventor: Corbett Hefner, Monte Vista, CO (US)

(73) Assignee: Formation Ag LLC, Monte Vista, CO (US)

( * ) Notice: Subject to any disclaimer, the term of this patent is extended or adjusted under 35 U.S.C. 154(b) by 508 days.

(21) Appl. No.: 16/272,835

(22) Filed: Feb. 11, 2019

(65) Prior Publication Data

US 2020/0253120 A1 Aug. 13, 2020

(51) Int. Cl.
*A01D 47/00* (2006.01)
*A01D 45/06* (2006.01)
(Continued)

(52) U.S. Cl.
CPC ............ *A01D 45/065* (2013.01); *A01D 34/42* (2013.01); *A01D 47/00* (2013.01); *A01D 43/02* (2013.01); *A01D 45/001* (2013.01); *A01D 61/02* (2013.01)

(58) Field of Classification Search
CPC ...... A01D 57/06; A01D 57/20; A01D 45/001; A01D 45/06; A01D 45/065; A01D 45/028; A01D 34/8355; A01D 34/02; A01D 34/125; A01D 41/14; A01D 41/145; A01D 41/16; A01D 43/06; A01D 43/07; A01D 43/086; A01D 61/02; A01D 61/002; A01D 47/00
See application file for complete search history.

(56) References Cited

U.S. PATENT DOCUMENTS 3,399,517 A * 9/1968 Magee ................... A01D 47/00
56/13.9
4,659,102 A * 4/1987 Stuhrmann .......... B62D 49/085
280/481

(Continued)

FOREIGN PATENT DOCUMENTS

DE    3606030 A1 *  8/1986   ............ A01D 41/06
EP    2556740 A1 *  2/2013   ........... A01D 45/065
(Continued)

OTHER PUBLICATIONS

Bish Enterprises, Super Crop Hemp Header, before Feb. 11, 2019, 3 pages.
Hempflax, Double Cut Combine, before Feb. 11, 2019, 3 pages.

*Primary Examiner* — Adam J Behrens

(57) ABSTRACT

A harvesting system for harvesting stalky plants is mountable on a power unit such as an agricultural or construction tractor having hydraulic power and/or a power takeoff (PTO). The system includes at least a reel-based harvesting head configured to cut off at least the tops of the plants and to transport the cut plants laterally of the harvesting system without threshing or otherwise processing the plants. The harvesting head may be mounted on, for example, an upper lift arm assembly or a three-point hitch mechanism of the power unit. If the harvesting head is mounted on the upper lift arm assembly of an agricultural tractor, a second harvesting head may be mountable on the tractor's three-point hitch mechanism beneath the first harvesting head for cutting stalks near their base, gathering the cut stalks, and windrowing the cut stalks behind the second harvesting head.

27 Claims, 12 Drawing Sheets

(51) Int. Cl.
  *A01D 34/42* (2006.01)
  *A01D 45/00* (2018.01)
  *A01D 61/02* (2006.01)
  *A01D 43/02* (2006.01)

(56) References Cited

U.S. PATENT DOCUMENTS

| | | | | |
|---|---|---|---|---|
| 5,029,650 A | * | 7/1991 | Smit | A01B 59/062 |
| | | | | 172/5 |
| 5,301,496 A | * | 4/1994 | Sudbrack | A01D 57/20 |
| | | | | 403/325 |
| 5,327,709 A | * | 7/1994 | Webb | A01D 41/14 |
| | | | | 56/14.4 |
| 5,535,578 A | * | 7/1996 | Honey | A01D 41/145 |
| | | | | 56/14.9 |
| 5,538,088 A | * | 7/1996 | Wait | A01B 59/06 |
| | | | | 172/439 |
| 6,619,021 B1 | * | 9/2003 | Chaney | A01D 41/142 |
| | | | | 56/10.9 |
| 6,764,270 B1 | * | 7/2004 | Bernhardt | A01B 51/026 |
| | | | | 414/685 |
| 6,971,225 B1 | * | 12/2005 | Kempf | A01D 57/20 |
| | | | | 56/398 |
| 9,392,745 B2 | * | 7/2016 | Bertino | A01D 45/22 |
| 2013/0125521 A1 | * | 5/2013 | Patterson | A01D 43/04 |
| | | | | 56/14.5 |
| 2019/0124840 A1 | * | 5/2019 | Bates | A01D 43/06 |

FOREIGN PATENT DOCUMENTS

| | | | | |
|---|---|---|---|---|
| EP | 3090617 B1 | * | 3/2020 | A01D 45/065 |
| EP | 3677110 A1 | * | 7/2020 | A01D 45/065 |
| FR | 3066881 A1 | * | 12/2018 | A01D 45/06 |
| PL | 70357 Y1 | | 11/2016 | |
| WO | WO-2007133098 A1 | * | 11/2007 | A01D 45/065 |

* cited by examiner

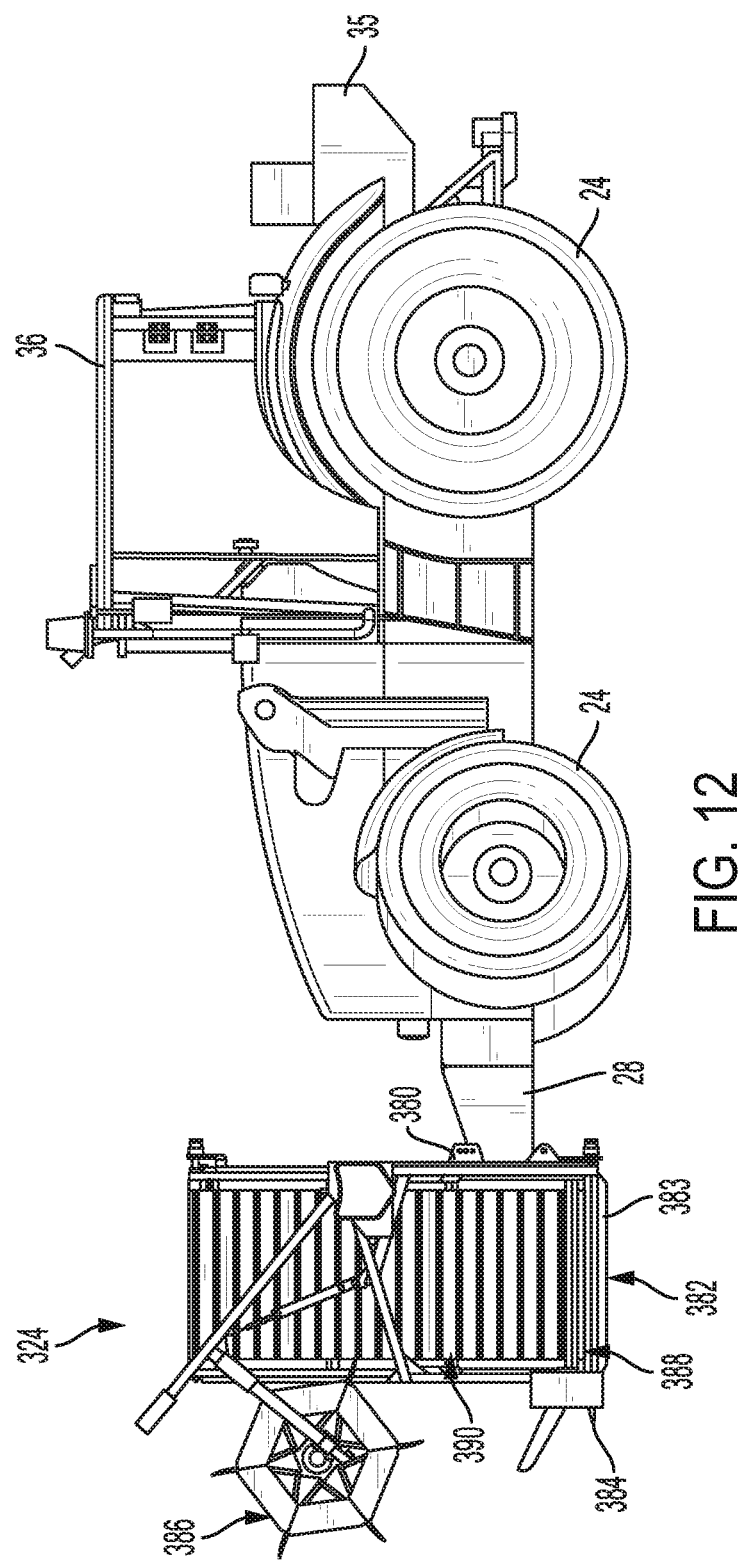

STALKY CROP HARVESTING SYSTEM AND PROCESS

BACKGROUND OF THE INVENTION

1. Field of the Invention

The invention relates generally to agricultural crop harvesters and, more particular, to a tractor-mounted harvester for harvesting stalky crops such as hemp.

2. Discussion of the Related Art

Agricultural harvesters are well known for harvesting a wide variety of crops. "Harvesting" as used herein means removing all or part of stalky crop plant from a field, gathering the removed plant materials, and, in some instances, processing the plant materials by threshing, chopping, etc. Harvesting may involve cutting off the stalk, as is the case with soybeans, wheat, oats, and rice, or simply removing portions of the plant from the stalk, as is the case with corn where ears are removed from stalks.

Hemp has recently enjoyed an immense increase in popularity for producing useful products such as fiber for rope and twine and/or for producing Cannabidiols such as CBD, which has a varied and ever-increasing cosmetic and therapeutic uses. The stalks of hemp plants serve as the source of fiber, whereas buds or flowers usually serve as the source for Cannabidiols.

Hemp historically was harvested only for its fibers and was harvested by hand or, in some cases, by sickle cutters or cutting bars that merely cut off the portion of the plant near the base. The cut plants then were subject to post cutting gathering either manually or by an agricultural rake. These harvesting processes are acceptable for small-scale production but not for large scale production, which is rapidly gaining popularity. Fields of dozens or hundreds of acres are increasingly common. Even hemp that is grown for fiber simply cannot be harvested economically using historical labor-intensive techniques. The less common hemp that is grown for Cannabidiols always has harvested by hand since hemp first was grown for Cannabidiols in 2014.

Combines typically are self-propelled machines that are provided with internal processing equipment for threshing the plants or otherwise separating the grain from other parts of the plant, storing the grain in on-board hopper, and discharging residual plant materials such as cobs, husks, stalks, pods, chaff, etc. A variety of specialized heads are available for mounting on the front of combine, with each head being tailored for harvesting a specific type of crop. Hence a "corn head" for harvesting corn is dramatically different in construction and operation than a "grain head" for harvesting soybeans or wheat. More recently, specialized harvesting heads have been proposed for mounting on combines such as the Bish Enterprises Super crop harvester, Hemp harvesting heads typically are modified version of one of these other heads.

Combines are very effective at removing crops from field but very expensive. They can cost up to $500,000 or more, excluding the cost of the specialized heads. Those costs can be driven even higher if a specialty head, such as a hemp harvesting head, is needed. That cost is too high to justify for all but large-scale producers of stalky crops, who are still the exception for hemp farmers.

In addition, processing certain crops using a combine or similar harvester can seriously degrade the crop plants. The primary task of all combines is to "thresh" or remove the grain from the seed coast and stalk. Threshing necessarily pulverizes or otherwise destroys a high percentage of the processed plant product. For example, threshing of hemp flowers seriously damages those flowers and, as such, damages the external trichomes of the plant, dramatically reducing the amount of oil that can be recovered from the harvested flower. Experiments have shown that threshing the flowers reduce the yield of Cannabidiols by 50-90%.

In addition, the typical combine is incapable of processing 2" to 3" diameter hemp stalks.

Similarly, if hemp or a similar stalky crop plant is being harvested for fiber production, the stalks often are chopped or broken into small pieces that reduce the length of recoverable fibers, degrading the value of the crop.

The need therefore has arisen for a stalky crop plant harvester that is less expensive than traditional combines.

The need additionally has arisen for a stalky crop plant harvester that cuts and gathers the entire stalks or a portion of the plant borne by the stalks with minimal or no damage to the plants.

The need additionally has arisen to provide a harvester that is uniquely adapted for Cannabidiol recovery.

The need additionally has arisen for a stalky crop harvester that can he readily adapted for different harvesting needs.

SUMMARY OF THE INVENTION

In accordance with a first aspect of the invention, one or more of these needs is met by providing a harvester for stalky crops such as hemp that can be mounted on and powered by a conventional power unit such as an agricultural or construction tractor rather than taking the form of an agricultural combine fitted with a specialized head. The harvester can be removed and reattached very quickly due the provision of quick-change connections for attaching the harvester to the tractor.

In one embodiment in which the harvester is configured to discharge the harvested materials laterally of the machine, the harvester includes a harvesting head for cutting and gathering the plants and a mount that supports the harvesting head on a power unit so as to take advantage of the power unit's pre-existing power and lift capabilities. The harvesting head includes a frame having front and rear ends and left and right ends, a sickle cutter mounted on the frame and extending between the left and right ends of the frame in the vicinity of the front of the frame, a rotatable gathering reel mounted on the frame above the sickle cutter, a conveyor such as a draper belt, and an offload boom. The conveyor is mounted on the frame behind the sickle cutter and underneath the reel and extends between the left and right ends of the frame. It has a discharge end located adjacent one of the left end and the right end the frame and is configured to receive cut materials directed thereto by the reel and to transport those materials to the discharge end thereof. The offload boom extends laterally away from the frame and has an inlet end located adjacent the discharge end of the first conveyor and a discharge end. The mount is located in the vicinity of the rear end of the frame and configured to be releasably mounted on a front attachment of a power unit.

The mount may be configured to be attached to front lift arms of an agricultural or construction tractor. In this case, the mount may include first and second spaced connection points configured for pivotable connection to respective lift arms of the tractor and third and fourth mounting points configured for connection to hydraulic tilt cylinders. These mounts may be adapted to mate with an existing quick-change bucket loader connector.

Alternatively, the mount may be configured to be attached to a front three-point hitch mechanism of an agricultural tractor. In this case the mount may include first and second laterally spaced attachment points, typically but not necessarily located on opposite sides of a longitudinal centerline of the frame, and a third attachment point located laterally between and vertically above the first and second attachment points.

In accordance with another aspect of the invention, the harvesting head is a first harvesting head configured to be mounted on front lift arms of an agricultural tractor, and a second harvesting head is provided. The second harvesting head is configured to be mounted on a front three-point hitch mechanism of the agricultural tractor below the first harvesting head. The second harvesting head is configured to cut off stalks near their base, at a location within one foot of the ground and to subsequently windrow the stalks.

Also disclosed is method of harvesting stalky crop plants.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which:

FIG. 12 is side elevation view of the harvesting system variant illustrated n FIG. 11.

DETAILED DESCRIPTION

Figure 1:
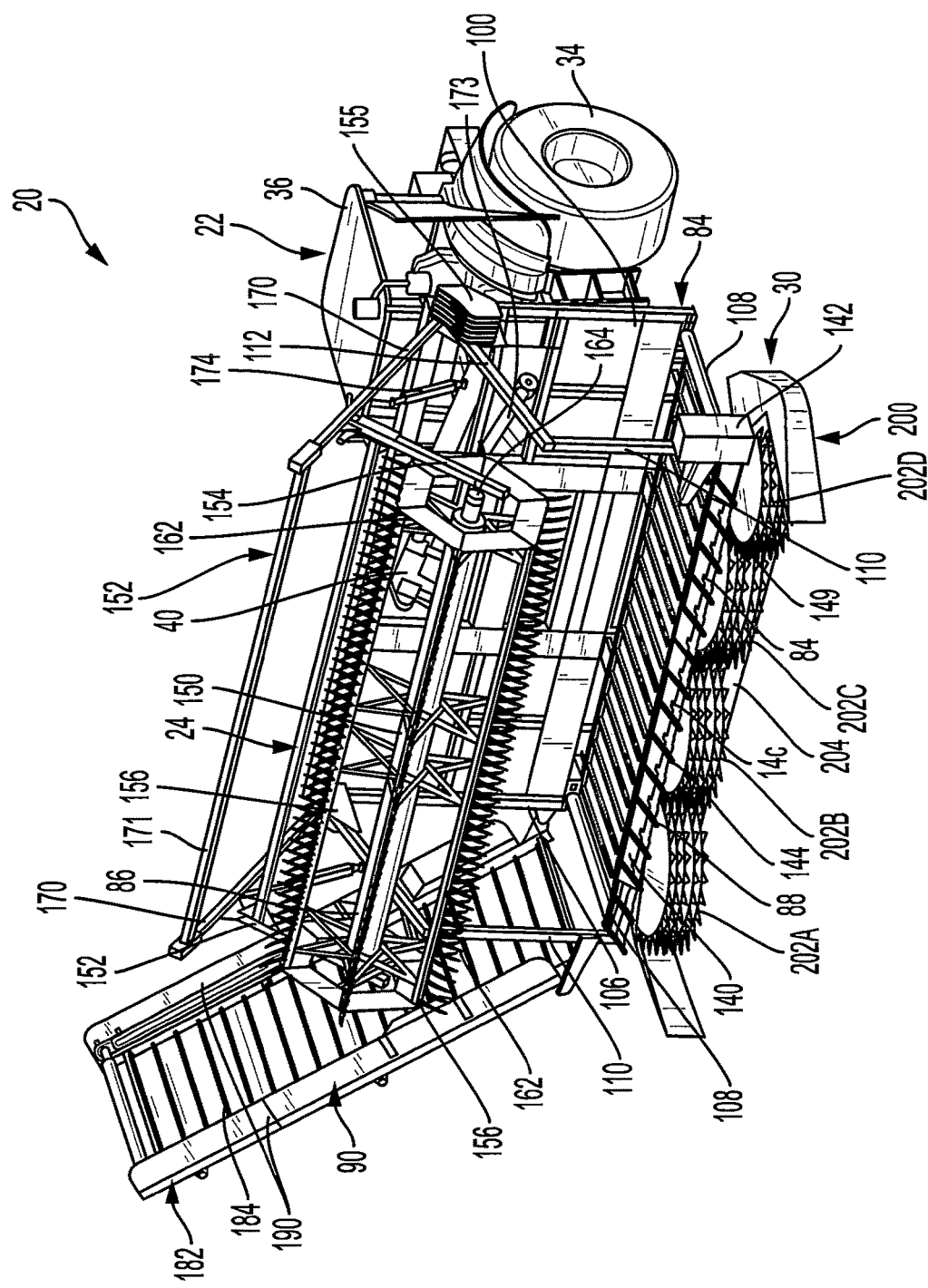
FIG. 1 is an isometric view of a harvesting system constructed in accordance with invention.
Figure 2:
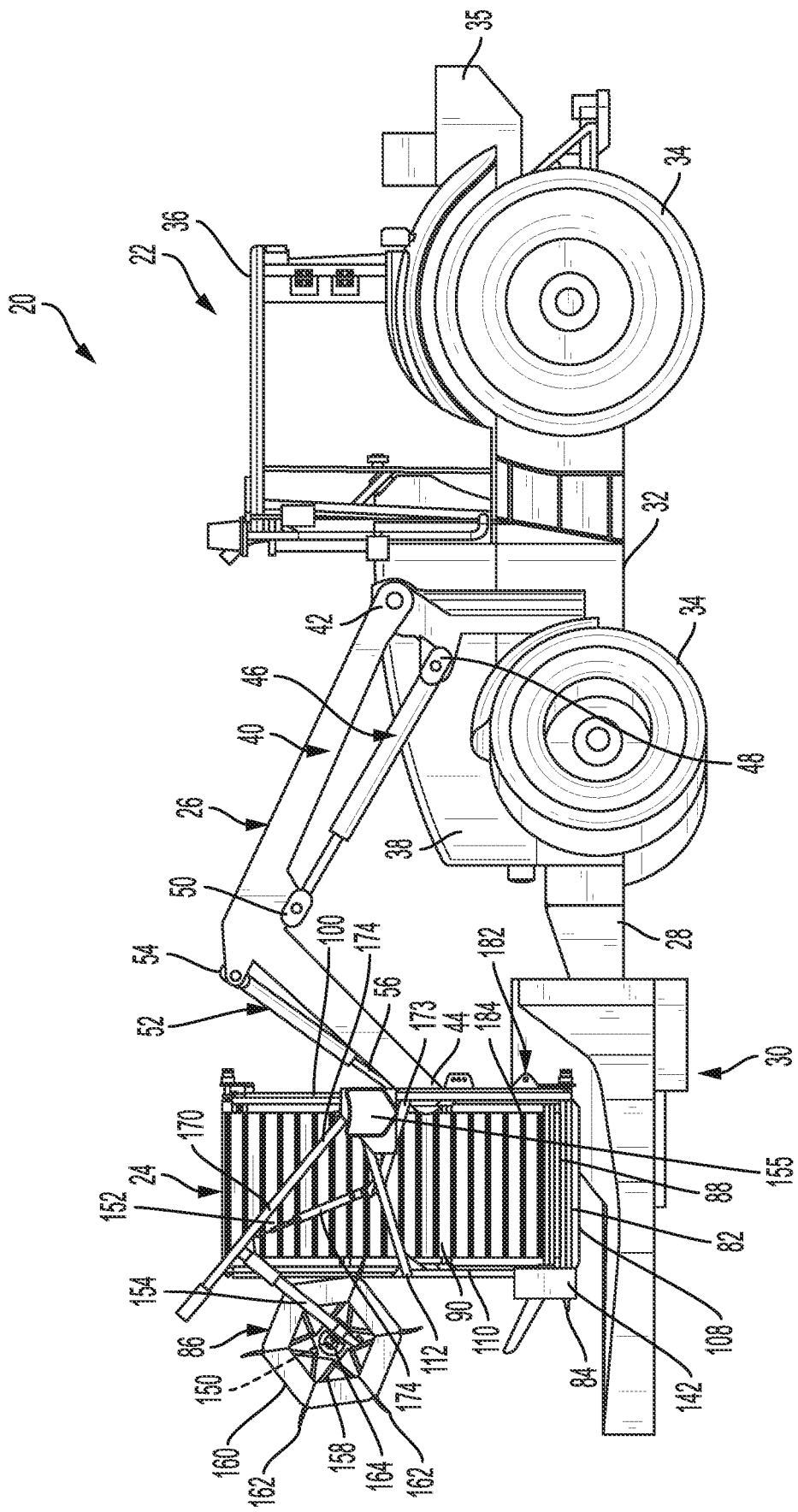
FIG. 2 is a side elevation view of the harvesting system of FIG. 1.
Figure 11:
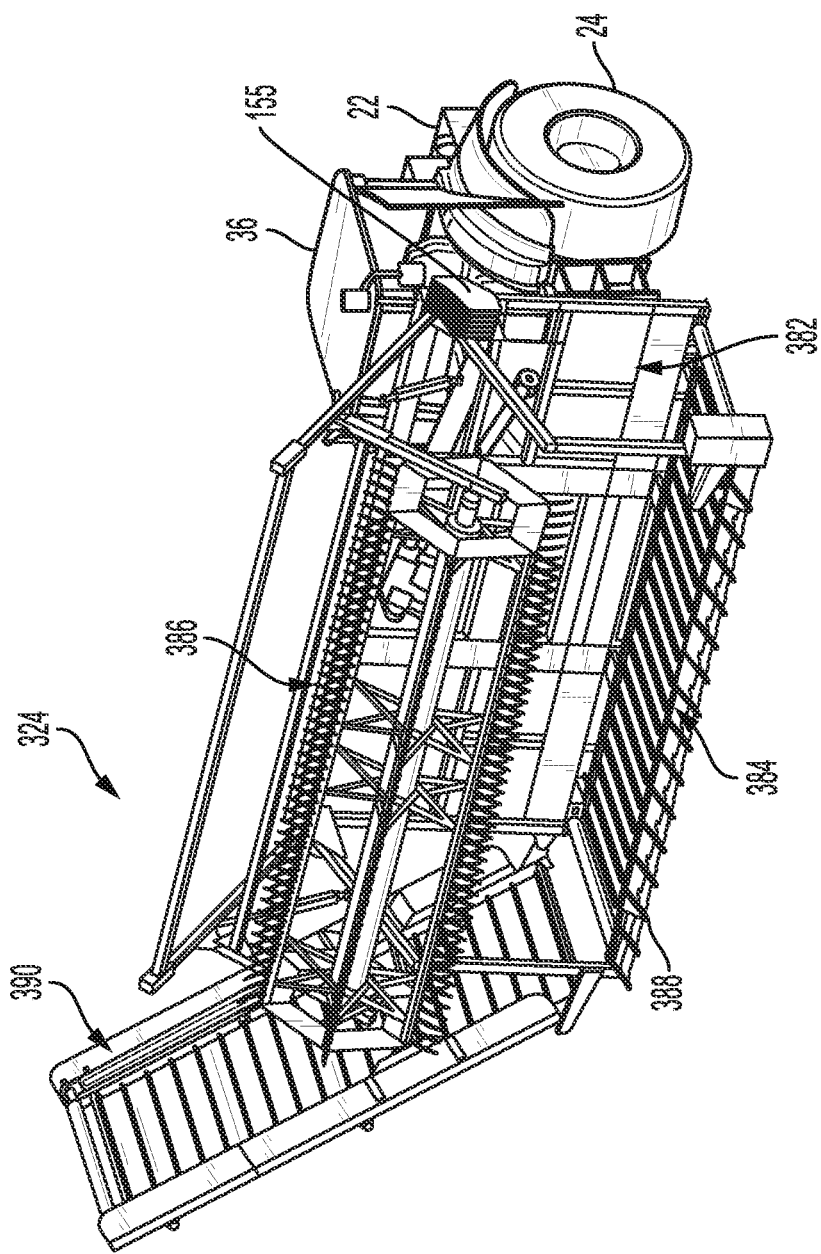
FIG. 11 is an isometric view illustrating a variant of the harvesting system of FIGS. 1 and 2 in which a single harvesting head is mounted on a front three-point hitch mechanism of the tractor.

Referring initially to FIGS. 1 and 2, a harvesting system 20 is illustrated is configured to harvest stalky plants such as hemp. The system 20 is shown as mounted on a conventional agricultural tractor 22 having hydraulic power and/or power takeoff (PTO). The system 20 includes at least a reel-based harvesting head 24 configured to cut off at least the tops of the plants and to transport the cut off plants laterally of the harvesting system 20. That harvesting head may be mounted either on an upper "loader" or lift arm assembly 26 of the tractor 22 as shown in FIGS I and 2 or on a front three-point hitch mechanism 28 of the tractor 22 is shown in FIGS. 11 and 12. The harvesting system 20 may additionally include a second harvesting head 30 that can be mounted on the tractor's three-point hitch mechanism 28 beneath the first harvesting head 24 as shown in FIGS. 1 and 2. The second harvesting head 30 is configured to cut stalks at their bases near the ground, direct the cut stalks to the center portion of the harvesting head 30, and windrow the cut stalks behind the harvesting head 30.

Referring still to FIGS. 1 and 2, the tractor 22 is a self-propelled agricultural tractor available from a variety of manufacturers including John Deere & Co. or CNH, Inc. Tractor 22 includes a chassis or frame 32 mounted on the ground wheels 34, an operator's cab 36, an engine (not shown) located under a hood 38, and hydraulic and power takeoff systems, all of which are typical of tractors of this type. Counterweights 35 are mounted on the frame 32 behind the cab 36 to partially offset the weight of the harvesting system 20 and enhance stability.

It should be noted that harvesting systems constructed in accordance with the invention could be adapted for mounting on power units other than agricultural tractors. Such power units include, but are not limited to, construction tractors, wheel loaders, windrow units, and silage cutters. Power units are to be distinguished from agricultural combines and other harvesters that thresh the harvested crop.

In any event, it is preferred, but not essential, that the tractor or other power unit have a power rating of at least 150 HP. In applications in which the header is raised using a bucket lift or similar mechanism, a 250 HP or greater large row crop tractor with front and rear dual tires preferably is used for stability.

Still referring to FIGS. 1 and 2, the loader 26 is mounted on the frame 32 in front of the operator's cab 36. As is typical, the lift arm assembly 26 includes a pair of laterally spaced angled lift arms 40. The rear end 42 of each lift arm 40 is pivotally attached to the frame 32 of the tractor 22 in front of the cab 36. The front end 44 of each lift arm 40 is pivotally attached to the supported device which, in the illustrated embodiment, comprises the mount of the first harvesting head 24. Each lift arm 40 can be pivoted about the frame 32 by a hydraulic cylinder 46 to raise and lower the front end of the left arm 40. Each hydraulic cylinder 46 has a. rear end 48 that is pivotally attached to the tractor frame 32 beneath the mounting point for the lift 40 arm and a front end 50 that is pivotally mounted to mount of the first harvesting head 24. An additional, tilt hydraulic cylinder 52 is provided on each lift arm 40 for tilting the harvesting head 24. Each tilt cylinder 52 has a rear end 54 located generally centrally of the lift arm 40 and a front end 56 that is configured for pivotal attachment to the supported device which, in this case, comprises the mount of the first harvesting head 24. Such loaders are commercially available, for example, from John Deere & Co., CHN, and Allen Loader.

Figure 10:
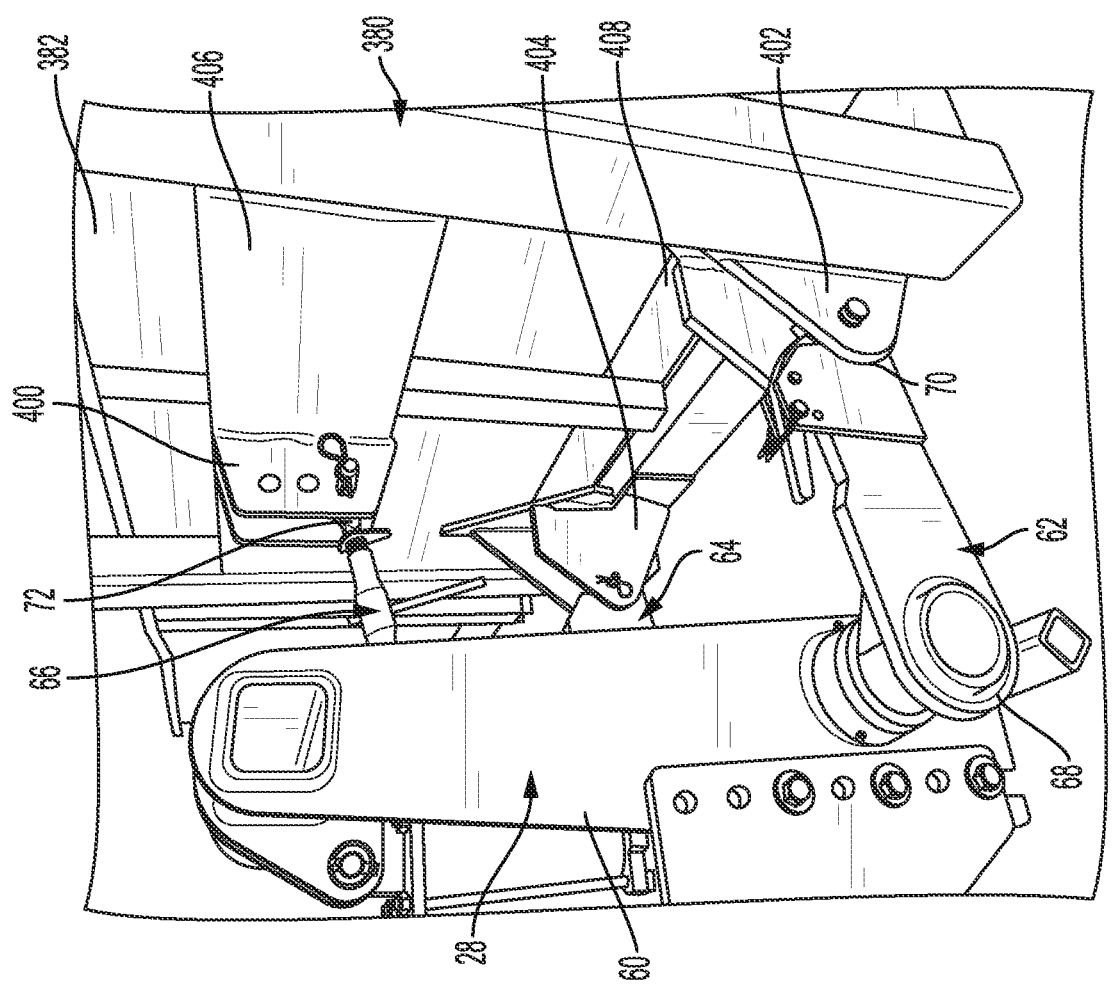
FIG. 10 is an isometric view of a mechanism for mounting a harvesting head of the harvesting system of FIGS. 1 and 2 on a three-point hitch mechanism of the tractor of FIGS. 1 and 2.

Referring briefly to FIG. 10, the three-point hitch mechanism 28, which may he standard and which is commercially available, for example, from Parma Co., John Deere & Co., or Zurdrich, includes a frame 60, a pair of laterally spaced lower arms 62 and 64,and an upper arm 66 disposed centrally between the lower arms 62 and 64. Each of the lower arms 62 and 64 has a rear end 68 that is pivotally mounted on the frame 60 and a front end 70 that is pivotally connected to the supported device, which in this case comprises the mount of the harvesting head 30. The center arm 66 similarly has a rear end (not shown) that is pivotally attached to the frame 60 and a front end 72 that is pivotally attached to the supported device. In operation, the arms 62, 64, and 66 are pivoted hydraulically or under power of the PTO to raise and lower the supported device, in this case the harvesting head 30. The typical front three-point hitch mechanism has a lifting stroke of 16" to 30".

Referring again to FIGS. 1-6, the first harvesting head 24 is a reel-type harvesting head extending transversely of the harvesting system 20. It may be generally of the type used to harvest grain or rice on combines, but ideally is adapted to harvest large, bushy plants without damaging those plants. An example of such as plant is Colorado hemp, which may be over 10' tall and be 3' or more in diameter at its base, much like a Christmas tree. Harvesting head 24 may have a cutting swath of more than 8.5 feet, more than 15 feet, and even of 25 feet or more. The harvesting head 24 includes a mount 80 supporting the harvesting head on the lift arm assembly 26 and a frame 82 on which the mount is affixed. The frame 82 extends longitudinally of the harvesting head 24 and transversely of the harvesting system 20. Mounted on the frame 82 are a sickle cutter 84 that extends longitudinally of the frame 82 and that is adapted to cut plants, a gathering reel 86 that is disposed above the sickle cutter and that is adapted to rake cut plants rearwardly, a conveyor in the form of a draper belt 88 that is configured to convey cut materials toward one lateral side (the right side in the illustrated embodiment) of the harvesting head 24, and an offload boom 90 that is adapted to convey materials received from the draper belt 88 laterally away from the frame 82 for discharge into, for example, a truck or a wagon (not shown) traveling in parallel with and adjacent to system 20. The reel 86 and conveyors are oversized when compared to other harvesting heads in order to resist damage and/or wrapping of tall plants and fiber. The frame 82 and sickle cutter 84 also are designed to minimize catch-points and other potential wrapping points.

Still referring to FIGS. 1-6, the frame 82 includes a rear subframe 100 on which the mount 80 is supported and a front subframe 102 disposed in front of the rear subframe 100. The rear subframe 100 may be a weldment including a plurality of vertically spaced, longitudinally extending plates104 that are mounted on plurality of longitudinally spaced, vertical supports 106. The front subframe 102 includes a lower horizontal support frame that underlies the remainder of the harvesting head, only first and second end-most longitudinally-extending supports 108 of which are shown. The rear end of each such support 108 is attached to the rear subframe 100. A vertical support post 110 is mounted on the front end of each of these end-most supports 108. Each support post 110 supports the front end of an inclined strut 112, the rear end of which is attached to the rear subframe 100. An opening thus is defined at each end of the frame 82 and is bordered by the rear subframe 100, a lower support 108, a front post 110, and an upper strut 112. The opening may be large enough to accommodate the passage of large, bushy plants without jamming or damaging the plants. In one embodiment, the opening is at least 48" deep by 48" high and, more typically, is 60" deep by 60" high.

Figure 5:
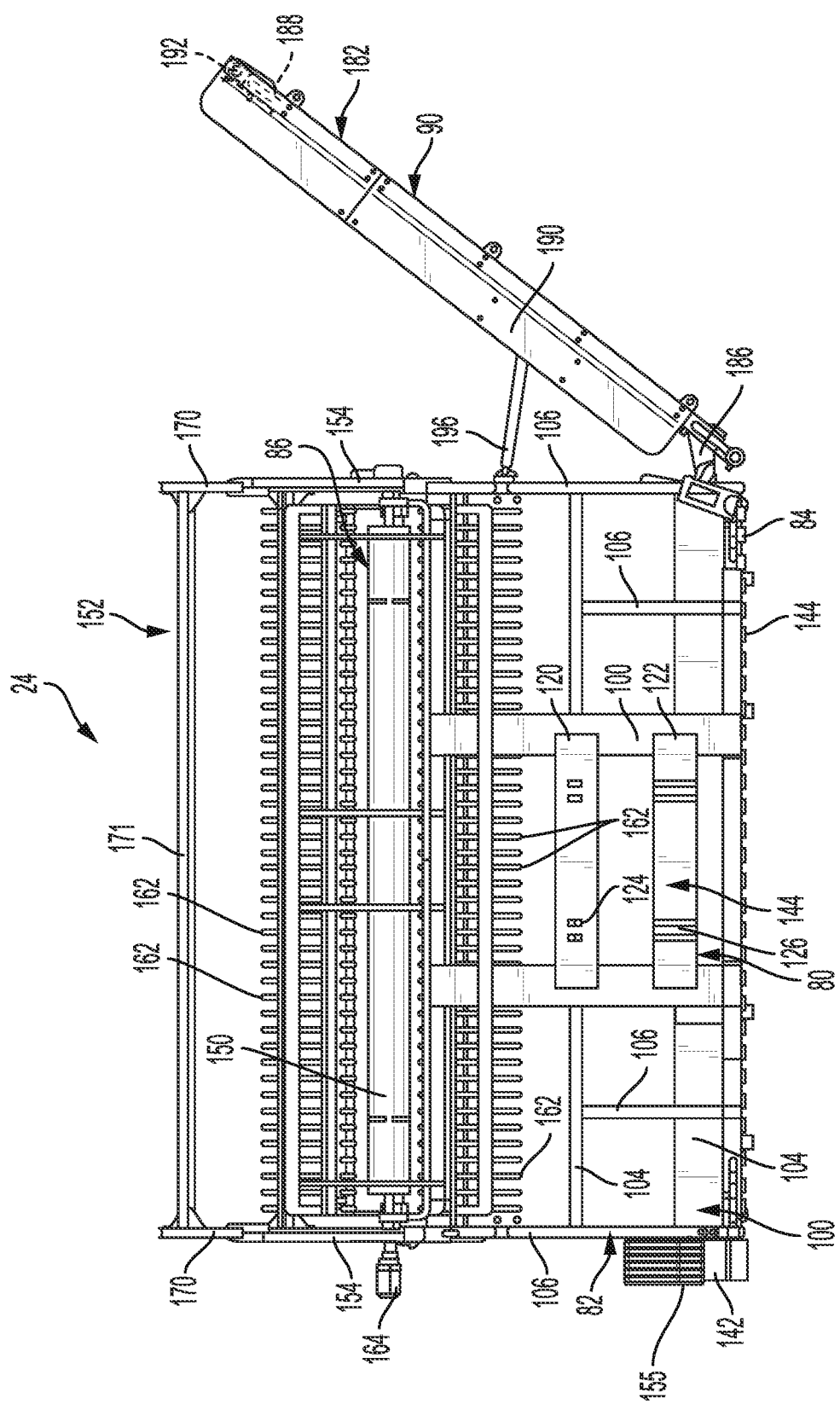
FIG. 5 is a rear elevation view of the harvesting head of FIGS. 3 and 4.

The mount 80 for the harvesting head 24 is shown schematically in FIG. 5. It includes a first and second vertically spaced plates 120 and 122 extending longitudinally of the rear subframe 100. Two sets (upper and lower) of pivot mounts 124 and 126 are mounted on the rear surfaces of the support plates 120, 122, respectively. The front ends 44 of the lift arms 40 of FIGS. 1 and 2 are pivotally connected to the lower mounts 126, and the front ends 56 of the tilt cylinders 52 of FIGS. 1 and 2 are pivotally connected to the upper mounts 124. With this arrangement, the entire harvesting head 24 can be raised and lowered by raising and lowering the lift arms 40, and the harvesting head 24 can be tilted about a horizontal axis by operation of the tilt cylinders 52.The connections may be quick-connects in the form of combinations of hooks and pins commonly found in quick connect loaders and the like. For example, the upper mounts 124 may comprise hooks, and the lower mounts 126 may comprise ear mounts. In a particularly preferred configuration, the quick-change arrangement may be of the type that permits complete mechanical attachment and detachment of the head to and from the loader arms and cylinder with single manually operated mechanism. Such a quick connect attachment is commercially available, for example, from John Deere & Co, under the model No. H 480. The term "quick connect attachment" and similar terms used herein mean that can be fully actuated by a reasonably skilled operator in no more than 30 minutes or less. Such a quick connect attachment, when used in combination with hydraulic manifold for hydraulic connections and a single 12-volt cable plug for electrical connections, permits attachment or detachment of the head in 5-10 minutes or even less.

Figure 3:
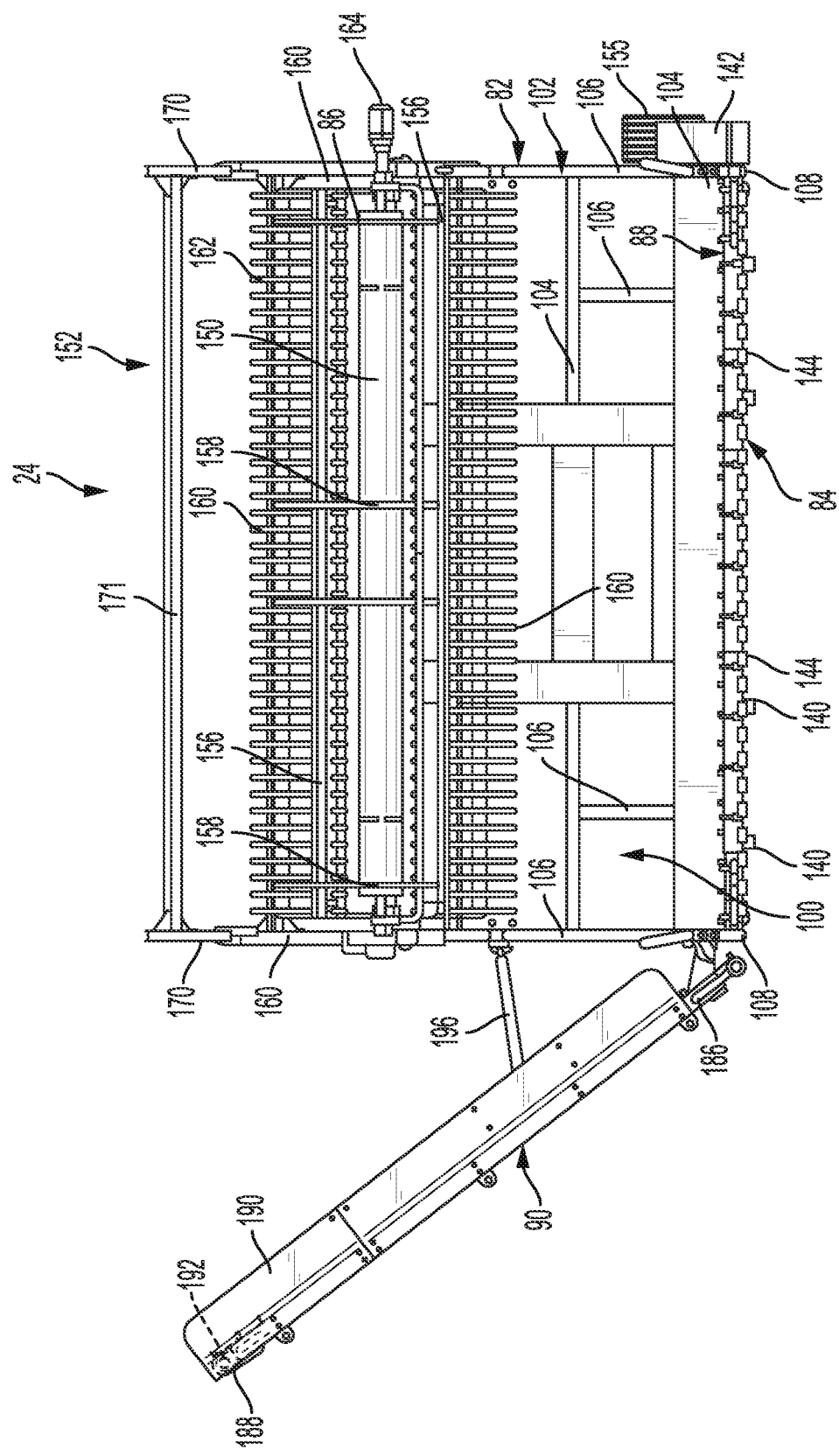
FIG. 3 is a front elevation view of a first, upper harvesting head of the harvesting system of FIGS. 1 and 2.
Figure 4:
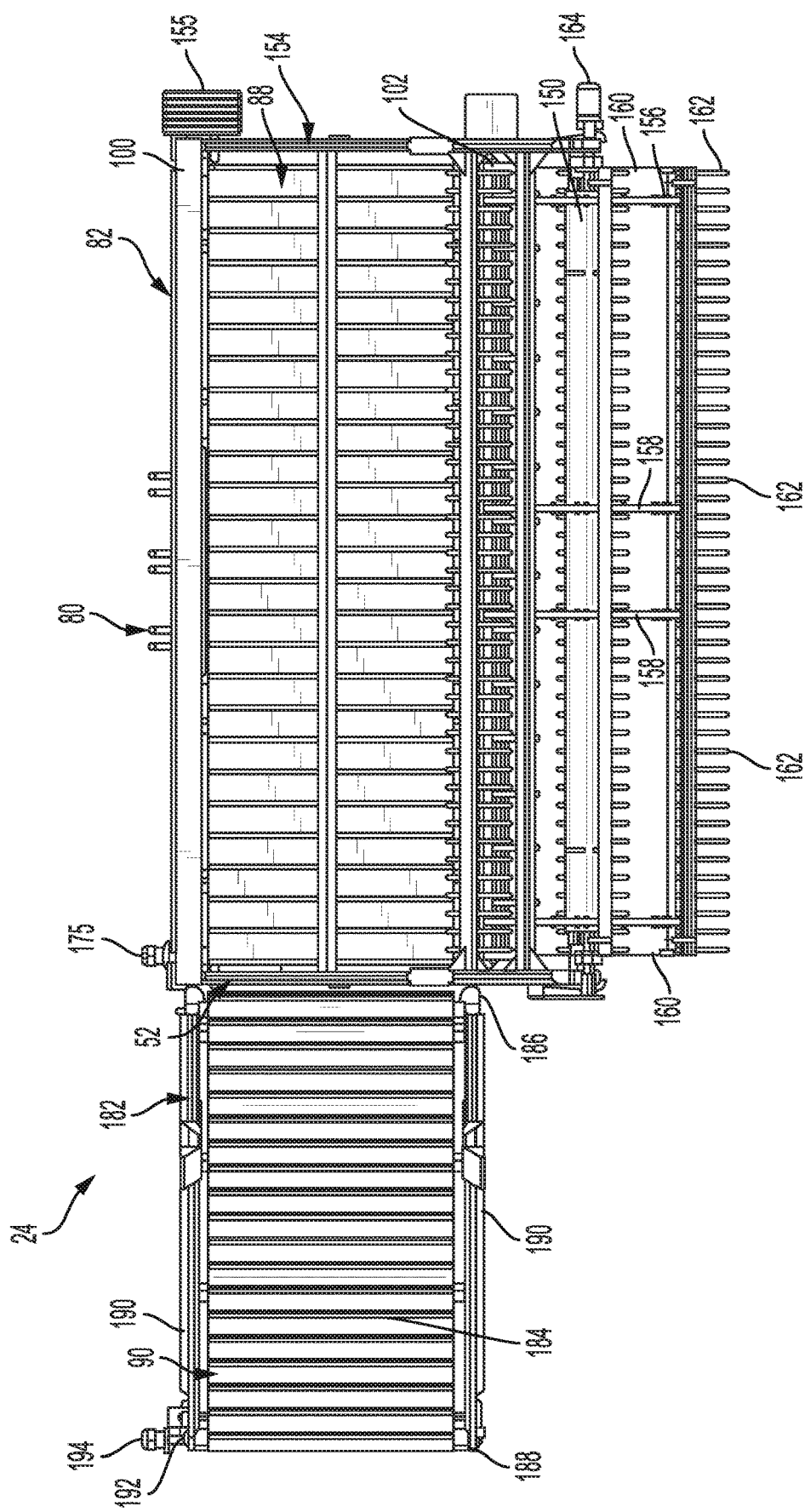
FIG. 4 is a top plan view of the harvesting head of FIG. 3.

Referring especially to FIGS. 1, 3, and 4, the sickle cutter 84 extends nearly the length of the harvesting head 24 and is supported on the front of the front subframe 102. As is standard, sickle cutter 84 includes a plurality of generally triangular knives 140 mounted on a bar that is driven to reciprocate longitudinally of the harvesting head 24 by a variable speed hydraulic motor 142. Stationary guide tines 144 are spaced along the sickle for guiding plants into the reciprocating knives 140 in an upright position. The sickle knives 140 may be at essentially the same height as the front of draper belt 88 to 6reduce shattering of harvested plant and, thus, improve yield.

Referring again to FIGS. 1-6, the gathering reel 86 includes a center support shaft 150 rotatably supported on a pair of spaced arms 154 of a reel support frame 152. The shaft 150 acts as hub on which a plurality of tine support arms 156 are mounted via a spaced spokes 158 and a pair of end support plate assemblies 160. Each tine support arm 156 supports a number of spaced spring tines 162 that, upon rotation of the reel 86, act as rakes that rake materials that have been cut by the sickle cutter 84 rearwardly onto thee draper belt 88. The shaft 150, and thus the reel 86 as a whole, is driven to rotate by a variable speed hydraulic motor 164 located adjacent one end of the shaft 150.

Still referring to FIGS. 1-6, each support arm 154 of the reel support frame 152 has a lower end bearing a respective end of the shaft 150 and an upper end mounted on an upper support arm 170 of the frame 152. Each upper support arm 170 is pivotally mounted on the rear subfrarne 100 of the harvesting head frame 82. The upper ends of the upper support arms 170 are connected to one another by a longitudinally extending cross brace 171. The support arms 154 at each end of the reel support frame 152 can be pivoted as an assembly by a hydraulic cylinder 174 connected to the associated upper support arm 170 at its upper and to a stationary support 173 at its lower end. Extension and retraction of the cylinders 174 pivots the reel 86 upwardly and downwardly relative to the remainder of the harvesting head 24 to accommodate different crop configurations and/or to clear jams. Further reel adjustability may be provided by making the lower support arms 154 telescoping and/or by permitting the upper end of each lower support 5arm 154 to be mounted on the associated upper support arm 170 at different locations using adjustable pins, bolts, or the like. All of the support structures for the reel 86 thus are located so as not to interfere with handling of large, bushy plants.

Referring to FIGS. 1, 2, and 4-6, the draper belt 88 is a rubber belt extending the length of the harvesting head 24. It has an inlet end located remotely from the offload boom 90 and a discharge end located adjacent the offload boom 90. It is wide enough to accommodate very wide, bush plants. Hence, the belt can be 36" wide, 48" wide or even 60" wide or wider. The belt 88 may be inclined rearwardly slightly (of on the order of 5-20 deg.) in order to encourage materials that have been raked onto the belt by the reel 86 to slide toward the rear subframe 100, which acts as a backstop. This inclination can be adjusted by adjusting the top link 124, by adjusting the connection point of the upper arm 66, and/or by actuating the tilt cylinders 52.

Figure 6:
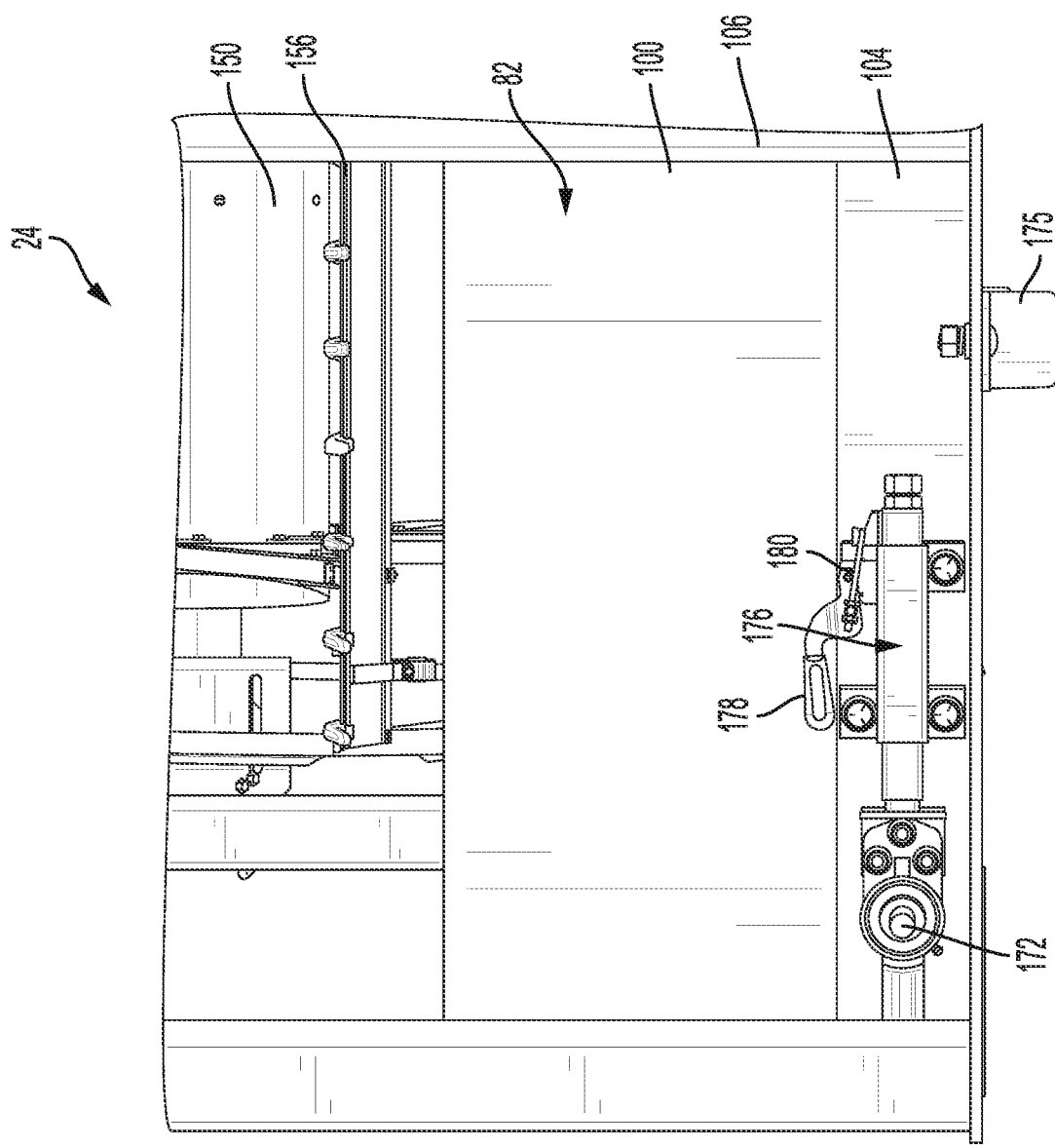
FIG. 6 is a fragmented enlarged rear elevation view of a portion of the harvesting head of FIGS. 3-5.

The draper belt 88 is mounted on a number of spaced pulleys 172, one of which is driven by a variable speed hydraulic motor 175. Referring to FIG. 6, the belt 88 is tensioned by a tensioner 176 acting on a driven pully 172 located at the upstream end of the draper belt 88. The tensioner 176 is provided with a quick release 178 that permits tension to be readily removed from the belt 88 for jam clearing or belt replacement. In the illustrated embodiment, the quick release 178 is actuated simply by rotating a handle clockwise to unlatch a latch 180 holding the tensioner 176 in position. Other quick release mechanisms could be employed as well.

Referring to FIGS. 1, 3 and 4 the offload boom 90 is located adjacent one end of the harvesting head frame 82. A counterweight 155 is mounted on the opposite end of the harvesting head frame 82 to balance the weight of the offload boom 90. Offload boom 90 has a lower, inlet end 186 located adjacent the discharge end of the draper belt 88 and an upper, discharge end 188. It's length may vary with application and design preference, typically between 8 and 20 feet and, more typically, of 10-12 feet. The offload boom 90 comprises a frame 182 and a belt 184 that is mounted on the frame 182. he width of the belt 184 may equal that of the draper belt 88 which, in this case, is 60".

The offload boom frame 182 includes a bottom end pivotally mounted to the harvesting head frame 82 and an upper end. Retention plates 190 are provided adjacent the sides of the frame 182 above the belt 184 to prevent conveyed materials from falling off the sides of the belt 184. The offload boom frame 18 supports a number of spaced pulleys 192 which, in turn, support the belt 184. One of these pulleys 192 is driven by a variable speed hydraulic motor 194 mounted on the upper end portion of the offload boom frame 182.

The inclination of the offload boom frame 182 can be adjusted, either for transport or to discharge materials at different heights, using a hydraulic cylinder 196 extending from the harvesting head frame 82 to a generally central portion of the offload boom frame 182. In the illustrated embodiment, the cylinder 196 is configured to pivot the offload boom 90 through an angular range of from 20 deg. to about 50 deg. It should be noted that, with disconnection of the cylinder 196 and the provision of appropriate retainers, the offload boom 90 could be pivoted to within 30 degrees of the vertical or even at or near a vertical orientation to minimize the width of the harvesting head 24 for transport.

It should be noted that the offload boom 90 could he mounted on frame 32 via a quick connect mechanism to permit its ready attachment and detachment. It is even possible to configure the offload boom 90 for attachment to either end of the frame 32, permitting crop discharge in either direction simply by reversing the direction that the draper belt 88 runs. Hence, either end of the draper belt 88 can be considered the "discharge end."

Figure 7:
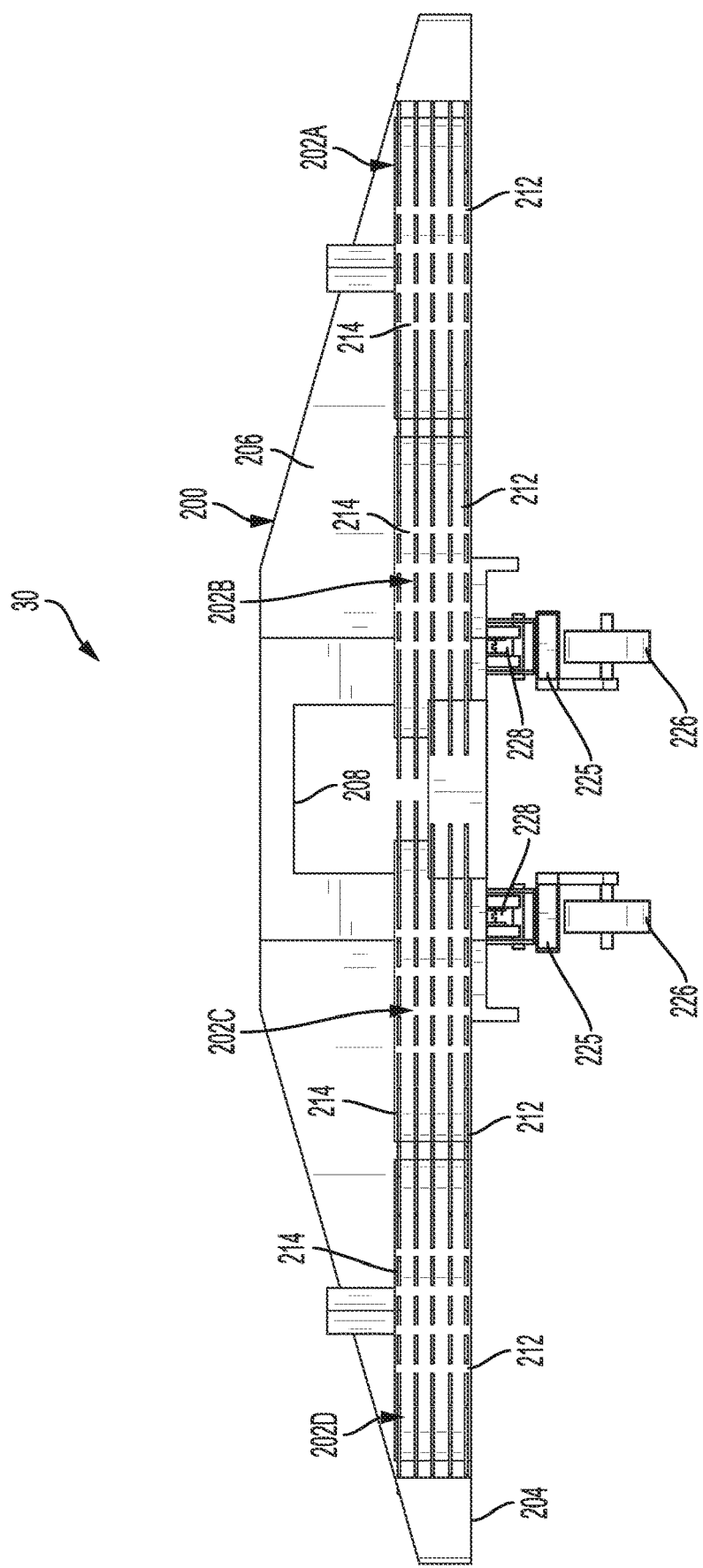
FIG. 7 is a front elevation view of the second, lower harvesting head of the harvesting system illustrated in FIGS. 1 and 2.
Figure 8:
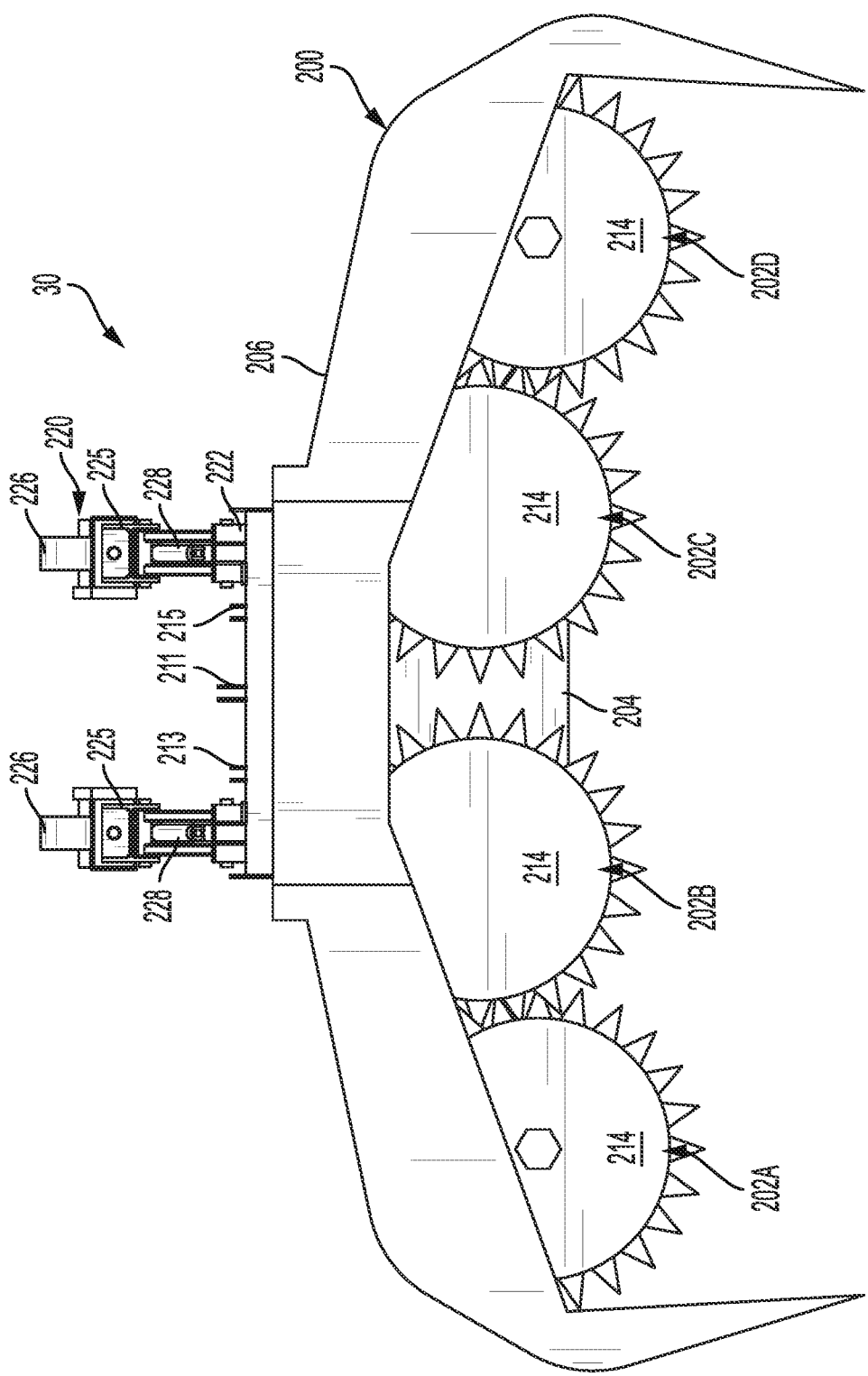
FIG. 8 is a top plan view of the harvesting head of FIG. 7.
Figure 9:
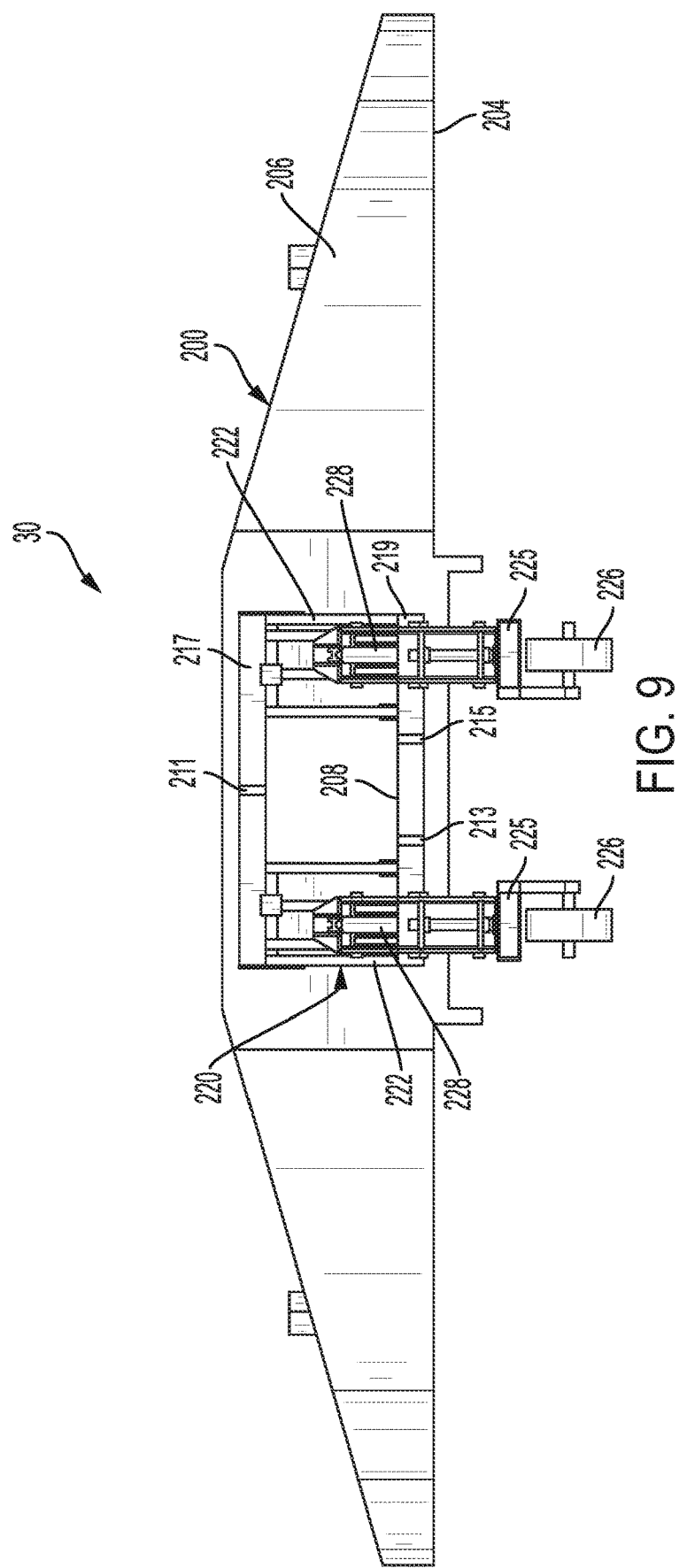
FIG. 9 is a rear elevation view of the harvesting head of FIGS. 7 and 8.

Referring now to FIGS. 1, 2, and 7-9, the lower harvesting head 30, if present, is mounted on the tractor's front three-point hitch mechanism 28. As mentioned, its purpose is to cut off stalks near the ground, direct those stalks toward the center of the harvesting head 30, and to discharge those stalks in a windrow behind the harvesting head 30 for baling or other handling. Importantly for fiber production applications, the lower harvesting head 30 is adapted to perform these tasks with minimal stalk bending or breakage, facilitating the recovery of long fibers in a subsequent decortication process. The illustrating harvesting head is a modified version of a harvesting head used to cut silage. Such "silage heads" are available from a variety of a manufacturers, including Kemper and Claas, Still referring to FIGS. 1, 2, and 7-9, the harvesting head 30 includes a frame 200 and a plurality (four in this embodiment) of cutting drums 202A-202D mounted on the frame 200 so as to he rotatable about vertical axes. The frame 200 has a bottom support plate assembly 204 and a rear plate assembly 206 extending upwardly from the rear edge of the bottom support plate assembly 204. As best seen in FIGS. 7 and 9, an opening 208 is formed in the center of the rear plate assembly 206 for the passage of cut stalks for windrowing.

Referring to FIGS, 8 and 10, a mount 210 is povided on the rear surface of the rear plate assembly 206 for attachment to the tractor's three-point hitch mechanism 28 as described above. The mount 210 includes an upper ear mount 211 located centrally of the harvesting head 30 and a pair of lower ear mounts 213 and 215 disposed on opposite sides of the upper ear mount 211. Ear mount 211 is mounted on a first support beam 217 located above the opening 208, and rear mounts 213 and 215 are mounted on a second support beam 219 located beneath the opening 208.

Referring to FIGS. 1, 7, and 8, the cutting drums 202A-202D are configured to cut stalks and to progressively transfer cut stalks toward a longitudinal centerline of the harvesting head 30. The cutting drums are spaced longitudinally of the harvesting head or laterally of the harvesting system 20. The two inboard cutting drums 202B and 202C are located slightly behind the two outboard cutting drums 202A and 2021D, Each drum 202A-202D includes a bottom, cutting wheel 212 with cutting teeth and one or more upper wheels 214 with conveying teeth. The lower cutting wheels 212 are driven at a higher speed than the upper wheels 214.

In order to improve the stability of the harvesting system and thus increase potential harvesting rates, the lower harvesting head 30 may be provided with a lift assist arrangement that supports part or all of the weight of the lower harvesting head 30 on the ground. In the illustrated embodiment, the lift assist arrangement includes a pair of vertically adjustable wheel assemblies 220 mounted on the rear support plate assembly 206 of the support frame 200 on opposite lateral sides of a longitudinal centerline of the second harvesting head 30. Referring to FIGS. 7 and 9, each wheel assembly 220 includes a stationary frame 222 affixed to the rear support plate assembly 206, a vertically movable support 225, a wheel 226 suspended from the support 225, and a hydraulic cylinder 228 that can be extended and retracted to raise and lower the wheel support 225 and the wheel 226 relative to the stationary frame 222.

In operation of the system 20, the tractor 22 drives through a field of stalky crop plants such as hemp with the cutting wheels 212 of the cutting drums 202A-202D of the second harvesting head 30 positioned one foot or less, and more typically about 6-9 inches, off the ground using the three-point hitch mechanism 28 and actuation of the lift assist assembly cylinders 228. At the same time the tractor's loader 26 is controlled to position sickle cutter 84 of the first harvesting head 24 at a desired height to cut the top portion from the plant. In the case of hemp used for Cannabidiol, the first harvesting head 24 will be positioned about 6' to 15' above the ground and the top 24" to 30" of the plants will be cut off. The position of the cutting heads 24 and 30 and the speeds of the driven elements can be controlled from inside the operator's cab 36 of the tractor 22.

As the harvesting system travels through the field, the sickle cutter 84 cuts off the tops of the plants, which are then raked onto the draper belt $8 by the reel 86. The draper belt 88 then conveys the cut materials to the offload boom 90, which conveys those materials to a wagon, truck, or other transporter traveling in parallel with the tractor 22. The oversized nature of the draper belt 88, the clearance over the draper belt 88, and the openings located at the discharge end of the harvesting head 24, coupled with the absence of threshing or chopping, minimizes damage to flowers or buds, maximizing Cannabidiol yields.

Essentially simultaneously, the cutting wheels 212 of the cutting drums 202A-202D of the second harvesting head 30 cut of the stalks near the base. The cutting drums 202A-202D direct the cut stalks progressively toward the center of the second harvesting head 30, where they are discharged though the rear opening 208 in the harvesting had rear plate assembly 206 under the action of the inboard cutting drums 202B and 202C to form a windrow. The tractor 22 passes over the windrow as it moves down the field. This windrowing is performed with little or no breakage of stalks, maximizing the potential for the recovery long fibers from the stalks.

All of these actions can performed at speeds of 3-5 miles per hour or even of 7 miles per hour or more if the ground is relatively smooth and level and/or if crop density is relatively low. Harvest rates of on the order of 10-15 acres per hour are certainly possible.

In many applications, the second harvesting head 30 will be employed only if there are separate uses for the upper and lower portions of the harvested plants. If, on the other hand, only the upper portion of the plant is of value, the first harvesting head 24 can be used without the second harvesting head 30 to cut off only the upper portions of the plants. The lower portions can thereafter simply he plowed under or otherwise handled.

Conversely, if the entire plant is of value, either harvesting head could be mounted on the tractor using the three-point hitch mechanism and used without the other. Such an arrangement is shown in FIGS, 11 and 1.2. The harvesting head 324 of this embodiment is identical to the upper harvesting head 24 of the first embodiment except for being adapted for mounting on a three-point hitch mechanism. Components of harvesting head 324 corresponding to components of the harvesting head 24 of the first embodiment are designated by the same reference numerals, incremented by 300.

Harvesting head 324 thus includes a mount 380 supporting the harvesting head 324 on the three-point hitch mechanism 28 of the tractor 22 and a frame 382 extending longitudinally of the harvesting head 324 and transversely of the tractor 22. Since the harvesting head 324 is designed to be operated close to the ground, skids 383 (FIG. 12) may be mounted under the frame 382 to inhibit damage to the frame 382 upon ground engagement. Mounted on the frame 382 are a sickle cutter 384 that extends longitudinally of the fame 382 and that is adapted to cut plants, a gathering reel 386 that is disposed above the sickle cutter 384 and that is adapted to rake cut plants rearwardly, a draper belt 388 that is configured to convey cut materials toward one lateral side (the right side in the illustrated embodiment) of the harvesting head 324, and an offload boom 390 that is adapted to convey materials received from the draper belt 388 laterally away from the frame 382 for discharge into, for example, a truck or a wagon (not shown).

The mount 380 of this embodiment is, as mentioned above, adapted for connection to a three-point hitch mechanism. Referring to FIG. 10, the mount 380 includes three ear mounts 400, 402, and 404 extending rearwardly from the rear of the frame 382. The first ear mount 400 is mounted on a horizontal beam 406 located centrally of the harvesting head 324 for connection to the arm 66 of the three-point hitch mechanism 28. The second and third ear mounts 402 and 404 are mounted a second horizontal beam 408 disposed beneath the first beam 406 are located on oppose sides of the first ear upper ear mount 400 for connection to the arms 62 and 64 of the three-point hitch mechanism 28.

In operation, the harvesting head 324 is mounted on the tractor's three-point hitch mechanism 28, and the tractor 22 is propelled through the field with the sickle cutter 384 positioned near, typically within one foot or less of, the ground. As the tractor 22 travels through the field, the sickle cutter 384 cuts off the plants near their bases, which are then raked onto the draper belt 388 by the reel 386. The draper belt 388 then conveys the cut materials to the offload boom 390, which conveys those materials to a wagon, truck, or other transporter traveling in parallel with the tractor.

While the invention is described herein in connection with specific embodiment(s), it will be understood it is not intended to limit the invention to these embodiment(s). On the contrary, it is intended to cover all alternatives, modifications and equivalents as may be included within the spirit and scope of the invention as defined by the appended claims. The scope of these and other changes will become apparent from the appended claims.

I claim:

1. A harvesting system for harvesting crops for Cannabidiol recovery, the harvesting system comprising:
 (A) a harvesting head including
  (1) a main frame having front and rear ends and left and right ends;
  (2) a sickle cutter mounted on the main frame and extending between the left and right ends of the main frame in the vicinity of the front end of the main frame,
  (3) a rotatable gathering reel mounted on the main frame above the sickle cutter, the gathering reel including a reel support frame mounted on the main frame and a rotatable reel mounted on the reel support frame, the reel support frame including first and second laterally opposed support arm assemblies, each of which includes an upper support arm extending upwardly and forwardly from the main frame and a lower support arm having a lower front end bearing a respective end of a shaft of the rotary reel and an upper rear end mounted on the upper support arm;

(4) a conveyor mounted on the main frame behind the sickle cutter and underneath the reel support frame and extending between the left and right ends of the main frame, the conveyor being at least 48 inches wide, having a discharge end located adjacent one of the left end and the right end the main frame, and being configured to receive cut materials supplied thereto by the reel and to transport those materials to the discharge end thereof, and (5) an offload boom extending laterally away from the main frame and having an inlet end located adjacent the discharge end of the conveyor and having a discharge end located laterally outboard of the main frame, the offload boom including 1) an offload boom frame having an inlet end mounted on the main frame beneath and independently of the reel support frame;

and having a discharge end, and 2) a conveyor mounted on the offload boom frame and having an inlet end and a discharge end, the offload boom being at least 48 inches wide; and (B) a mount located in the vicinity of the rear end of the main frame and configured to be releasably mounted on an attachment of a power unit.

2. The harvesting system of claim 1, wherein the mount is configured to be attached to front lift arms of the power unit.

3. The harvesting system of claim 2, wherein the mount includes first and second spaced attachment points configured for pivotable connection to respective lift arms of the power unit and third and fourth attachment points configured for connection to respective hydraulic cylinders.

4. The harvesting system of claim 2, wherein the mount is configured for attachment to a quick-connect attachment mechanism coupled to first and second lift arms and first and second tilt cylinders of the power unit.

5. The harvesting system of claim 2, wherein the mount is configured to be attached to a front three-point hitch mechanism of the power unit and includes first and second attachment points spaced longitudinally from one another and a third attachment point located between and above the first and second attachment points.

6. The harvesting system of claim. 2, wherein the power unit is an agricultural tractor, a construction tractor, or a wheel loader.

7. The harvesting system of claim 1, wherein a portion of the reel support frame can be raised and lowered relative to the main frame under the operation of a hydraulic cylinder.

8. The harvesting system of claim 7, wherein the reel support frame includes a support that extends depthwise of the main frame above the conveyor and that defines an upper edge of a vertical opening between the conveyor and the support, the vertical opening being at least 12 inches high and at least 48 inches wide.

9. The harvesting system of claim 8, wherein the vertical opening is at least 24 inches high.

10. The harvesting system of claim 1, wherein the conveyor is a draper belt conveyor.

11. The harvesting system of claim 10, wherein the conveyor is a draper belt conveyor having a width of at least 60 inches.

12. The harvesting system of claim 1, wherein the offload boom is pivotable about a horizontal axis to raise and lower the discharge end thereof relative to the inlet end thereof.

13. The harvesting system of claim 12, wherein the offload boom is raiseable to a transport position in which it extends no more than 30° from vertical.

14. The harvesting system of claim 12, wherein the offload boom is mountable on either the left end of the main frame or the right end of the main frame, and the wherein the conveyor is reversible.

15. The harvesting system of claim 1, wherein the harvesting head is a first harvesting head configured to be mounted on front lift arms of a tractor, and further comprising a second harvesting head configured to be mounted on a front three-point hitch mechanism of the tractor below the first harvesting head, the second harvesting head being configured to cut off stalks at a location within one foot of the ground and to windrow the stalks.

16. The harvesting system of claim 15, wherein the second harvesting head includes a second harvesting head frame and a plurality of cutting drums that are mounted on the second harvesting head frame so as to be rotatable about vertical axes, the cutting drums being configured to cut stalks and to progressively transfer cut stalks toward a longitudinal centerline of the second harvesting head, and wherein two adjacent cutting drums that are located on opposite sides of the longitudinal centerline of the second harvesting head are configured to direct cut stalks rearwardly beyond the second harvesting head to windrow the cut stalks.

17. The harvesting system of claim 15, wherein the second harvesting head includes a mount that is configured to be attached to the front three-point hitch mechanism of the tractor and that includes first and second attachment points spaced longitudinally from one another with respect to the second harvesting head and a third attachment point located between and above the first and second attachment points.

18. The harvesting system of claim 17, further comprising first and second wheels that are disposed on opposite lateral sides of a longitudinal centerline of the second harvesting head and that at least partially support the second harvesting head on the ground.

19. A harvesting head for harvesting crops for Cannabidiol recovery, the harvesting head comprising:

(A) a main frame having front and rear ends and left and right ends;

(B) a sickle cutter mounted on the main frame and extending between the left and right ends of the main frame in the vicinity of the front of the main frame;

(C) a rotatable gathering reel mounted on the main frame above the sickle cutter, the gathering reel including a reel support frame mounted on the main frame and a rotatable reel mounted on the reel support frame, the reel support frame including first and second laterally opposed support arm assemblies, each of which includes an upper support arm extending upwardly and forwardly from the main frame and a lower support arm having a lower front end bearing a respective end of a shaft of the rotary reel and an upper rear end mounted on the upper support arm;

(D) a conveyor mounted on the main frame behind the sickle cutter and underneath the reel support frame and extending between the left and right ends of the main frame, the conveyor being at least 48 inches wide, having a discharge end located adjacent one of the left end and the right end the main frame, and being configured to receive cut materials directed thereto by the reel and to transport those materials to the discharge end thereof;

(E) an offload boom extending laterally away from the frame and having an inlet end located adjacent the discharge end of the conveyor and a discharge end, the offload boom including 1) an offload boom frame having an inlet end mounted on the main frame beneath and independently of the reel support frame and having a discharge end disposed laterally outboard of the main frame, and 2) a conveyor mounted on the offload boom frame and having an inlet end and a discharge end, the offload boom being at least 48 inches wide; and (F) a mount located in the vicinity of the rear end of the main frame and configured for quick attachment to a front attachment of a power unit.

20. The harvesting head of claim 19, wherein the mount includes attachment points configured for coupling to a quick-attachment mechanism that couples the mount to first and second lift arms of the power unit and first and second tilt cylinders of the power unit.

21. The harvesting head of claim 19, wherein the mount is configured to be attached to a front three-point hitch mechanism of a tractor and includes first and second attachment points spaced longitudinally from one another with respect to the main frame and a third attachment point located between and above the first and second attachment points.

22. A method of harvesting stalky plants for Cannabidiol recovery, the method comprising:

(A) providing a harvesting head mounted on a power unit, the harvesting head including a main frame;

(B) vertically moving the harvesting head to a harvesting position; and, (C) using the harvesting head
(1) cutting off at least a portion of the plants using a sickle cutter extending longitudinally of the harvesting head and mounted on the main frame;
(2) directing the cut plants longitudinally of the harvesting head and laterally of the power unit, the directing being performed by a gathering reel located above the sickle cutter, the gathering reel including a reel support frame mounted on the main frame and a rotatable reel mounted on the reel support frame, the reel support frame including first and second laterally opposed support arm assemblies, each of which includes an upper support aim extending upwardly and forwardly from the main frame and a lower support arm having a lower front end bearing a respective end of a shaft of the rotary reel and an upper rear end mounted on the upper support arm;
(3) using a first conveyor, directing the cut plants, longitudinally of the harvesting head, away from the harvesting head the first conveyor being at least 48 inches wide, being mounted on. the main support frame behind the sickle cutter and beneath the reel support frame, and having a discharge end, and
(4) discharging the cut plants from the harvesting head using an offload boom having an offload boom frame and having a second conveyor that is mounted on the offload boom frame and that receives cut plants from the first conveyor, the offload boom being at least 48 inches wide, the offload boom having an inlet end and a discharge end, the inlet end of the offload boom being disposed adjacent the discharge end of the first conveyor and being mounted on the main frame of the harvesting head at location beneath and independently of the reel support frame, and the discharge end of the offload boom located laterally beyond the power unit.

23. The method of claim 22, wherein vertically moving is performed by a front three-point hitch mechanism of the power unit on which the harvesting head is mounted, and wherein cutting comprises cutting of the plants at bases thereof.

24. The method of claim 22, wherein the power unit is a tractor or a wheel loader and the vertically moving is performed by operating lift arms of the tractor or wheel loader.

25. The method of claim 22, further comprising attaching the harvesting head to the power unit in less than 10 minutes.

26. The method of claim 22, wherein vertically moving is performed by a front three-point hitch mechanism of the power unit.

27. The method of claim 22, wherein the power unit is a tractor, and the harvesting head is a first harvesting had that cuts off upper ends of the plants, and further comprising, using a second harvesting head mounted on the tractor beneath the first harvesting head, cutting of the stalks of the plants within one foot of the ground and then windrowing the stalks.

* * * * *